United States Patent [19]

Higasa et al.

[11] Patent Number: 5,099,145
[45] Date of Patent: Mar. 24, 1992

[54] SYSTEM DISCONNECTION DETECTION CIRCUIT FOR A DISTRIBUTED LOCATION POWER SOURCE

[75] Inventors: Hiromasa Higasa; Fumihiko Ishikawa; Shigenori Matsumura, all of Takamatsu; Takeshi Takemura; Toshihisa Shimizu, both of Kawasaki, all of Japan

[73] Assignees: Fuji Electric Co., Ltd., Kawasaki; Shikoku Research Institute Incorporated, Takamatsu, both of Japan

[21] Appl. No.: 598,703
[22] PCT Filed: Apr. 5, 1990
[86] PCT No.: PCT/JP90/00463
§ 371 Date: Oct. 23, 1990
§ 102(e) Date: Oct. 23, 1990
[87] PCT Pub. No.: WO90/12440
PCT Pub. Date: Oct. 18, 1990

[30] Foreign Application Priority Data

Apr. 6, 1989 [JP] Japan ............................ 1-87694
Sep. 12, 1989 [JP] Japan ........................... 1-236401
Mar. 7, 1990 [JP] Japan ............................ 2-53571

[51] Int. Cl.$^5$ .................... H02H 3/46; H02H 3/27
[52] U.S. Cl. .................................... 307/140; 363/56
[58] Field of Search ............... 307/137, 140; 363/55, 363/56; 361/18, 86, 85, 87

[56] References Cited

U.S. PATENT DOCUMENTS

| 3,597,735 | 8/1971 | Nakayama | 307/87 |
| 4,073,004 | 2/1978 | Chambers et al. | 363/56 |
| 4,408,246 | 10/1983 | Ray | 361/85 |
| 4,939,617 | 7/1990 | Hoffman et al. | 361/87 |

Primary Examiner—A. D. Pellinen
Assistant Examiner—Richard Elms
Attorney, Agent, or Firm—Spencer & Frank

[57] ABSTRACT

A system disconnection detection circuit for a distributed location power source having a generating element and an invertor for converting a generated output from the generating element into an AC output superimposes a selected signal on the AC output of the invertor. The circuit detects system disconnection on the output side of the invertor on the basis of the AC output of the invertor on which the selected signal has been superimposed.

8 Claims, 14 Drawing Sheets

WHEN POWER SYSTEM IS CONNECTED

WHEN POWER SYSTEM IS DISCONNECTED

SYSTEM DISCONNECTION DETECTION CIRCUIT FOR A DISTRIBUTED LOCATION POWER SOURCE

BACKGROUND OF THE INVENTION

1. Field of the Invention

The present invention relates to a system disconnection detection (SDDC) circuit for a distributed location power source (DLPS) connected to a power system through a line, so that when system disconnection occurs, the system disconnection can be detected in order to isolate or stop the operation of the distributed location power source connected to the line that has disconnected from the power system.

2. Background Information

A distributed location power source is basically made up of a generating element and an inverter for converting the output from the generating element into an AC output. For example, with this type of distributed location power source provided in individual housing facilities, then a device such as a solar cell could be used as the generating element.

FIG. 15 shows a conventional type of system disconnection detection circuit for a distributed location power source.

In FIG. 15, a distributed location power source (DLPS) 140 comprises a DC power source 1, an inverter 2, a circuit breaker 4 and a receiver 3. The DC power source 1, acting as a generating element, is connected to the DC input terminal of the inverter 2. A load 5 is connected to the AC output terminal of the inverter 2 through the circuit breaker 4 and a line 9. The circuit breaker 4 if the distributed location power source 140, and a circuit breaker 7 of a power system 6 are connected together by the line 9. A signal notifying the opening of the circuit breaker 7 is fed to the receiver 3 via a dedicated signal line 8.

With this arrangement, when system disconnection occurs, that is, the circuit breaker 7 of the power system 6 opens, voltage is applied to the circuit breaker 7 from the distributed location power source 140 via the line 9. In other words, a reverse voltage condition arises, posing a danger to control of the circuit breaker 7 and causing problems with power system security. To avoid this, a signal informing of the opening of the circuit breaker 7 is transmitted to the receiver 3 via the dedicated signal line 8, and the circuit breaker 4 is opened by means of the receiver 3, thereby isolating the distributed location power source 140. That is to say, either the line 9 is disconnected or operation of the inverter 2 is stopped.

In this type of conventional system disconnection detection circuit, if the signal from the point of system disconnection informing of the system disconnection is not received, then system disconnection cannot be detected. Usually, the distance between the distributed location power source 140 and the power system 6 is great. Accordingly, the dedicated signal line 8 for the system disconnection informing signal must also be very long, and furthermore, since facilities for setting up the signal line are also necessary, the conventional system disconnection detection circuit is extremely expensive.

SUMMARY OF THE INVENTION

In view of the above problems, it is an object of the present invention to provide a system disconnection detection circuit for a distributed location power source that is very economical, and furthermore, one that can detect system disconnection extremely reliably.

According to a first aspect of the present invention for solving the above problem, there is provided in a distributed location power source having a generating element and an inverter for converting the output the generating element into an AC output, a superimposing device for superimposing prescribed or selected information on the AC output of the inverter, and a detection device for detecting a system disconnection in the output terminal of the inverter based on a signal from the AC output terminal of the inverter that has been superimposed with the prescribed information.

In this way, system disconnection can be detected within a distributed location power source connected to a power system via a circuit, without using a dedicated signal line introduced from outside.

According to a second aspect of the present invention for solving the above problem, there is provided a first oscillator and an effective lower setter: the first oscillator oscillates at a frequency proportional to or substantially proportional to an effective power command value; and the effective power setter increases or decreases the effective power command value slightly in synchronism with the first oscillator at a fixed ratio to the effective power command value. Thus, the effective power supplied to the power system from the inverter is increased or decreased slightly.

Furthermore, a second oscillator, a counter and a detector are provided: the second oscillator, on the basis of the detected effective power, produces a pulse train of a frequency proportional to or substantially proportional to the value of the effective power; the counter upcounts and subsequently downcounts the pulses of the pulse train in accordance with the increase or decrease in the effective power in synchronism with the oscillating period of the first oscillator; and the detector detects system disconnection when the value obtained as the result of the downcount performed from the upcounted value goes below a fixed value.

Thus, with the second aspect of the present invention, the voltage phase of the AC output terminal of the inverter (the voltage phase with regard to that of the power system) is slightly changed, and the amount of change in the effective power supplied to the power system from the inverter is observed; and depending on a decrease in this amount of change after system disconnection, the system disconnection is detected. In this case, effective power setter, acting as a means to slightly change the effective power, outputs a value proportional to or substantially proportional to the effective power command value in order to increase or decrease the amount of the slight change in proportion to the magnitude of the generated output of the DC power source.

On the other hand, as the method of observing the fluctuation amount, the following step is taken: the difference between the effective power amount at the time of increase and at the time of decrease is computed by using the second oscillator and the counter to determine the effective power change amount. At this time, the first oscillator is used to change the count time so that the count values of the respective effective power amounts at the time of increase and decrease are independent of the size of slight fluctuations in the effective power and are practically constant. As a result, the judged difference of the effective power amounts is practically constant. In this way accuracy of the system disconnection judgment is improved. Also, since the range of fluctuation in the amount of power consumption of the DC power source becomes constant, stability of the DC power source is facilitated.

Furthermore, the detector can be provided with an opening control device and a close control device: the opening control device is provided for opening the circuit breaker on the AC output terminal of the distributed location power source in response to the system disconnection detection signal; and the close control device is provided for detecting the return of power of the power system after opening the circuit breaker on the AC output terminal and for closing the circuit breaker on the AC output terminal. The detection of the return of power is performed by detecting the closing of the circuit breaker on the power system side on the basis of a voltage difference between the circuit breaker on the AC output terminal of the distributed location power source and the line of the power system. In this way, the distributed location power source can be quickly reconnected to the power source after the return of power, because it is possible to detect the return of power of the power system side after system disconnection.

According to a third aspect of the present invention for solving the above problem, the voltage phase on the AC output terminal of he inverter in the distributed location power source is slightly changed by means of the oscillator, and by this, the inverter changes the effective power supplied to the power system. When the distributed location power source is connected through the line to a power system with a very large power capacity compared to the generating capacity of the distributed location power source, the frequency on the line is maintained approximately constant even though the inverter changes the amount of power to be supplied to this connected line. On the other hand, when not the power system but another power source such as a distributed location power source or a power generator of a power capacity comparable to the generating capacity of the distributed location power source is connected, the distributed location power source detects the system disconnection from the power system on the basis of the fact that the change of frequency at the connection point corresponds to the change of the amount of the effective power supply fed to the other connected power source.

In the third aspect of the present invention, an effective power setter, a frequency component extractor, and a detector are provided: the effective power setter is provided for slightly increasing or decreasing the effective power amount supplied to the power system by the inverter in synchronism with the oscillator; the frequency component extractor is provided for extracting the oscillation frequency component of the oscillator from the voltage at the connection point of the inverter; and the detector is provided for detecting the system disconnection on the basis of the output value from the frequency component extractor.

Accordingly, in the case of the third aspect of the present invention, the voltage phase of the AC output terminal of the inverter (the phase difference with respect to the voltage of the power system or another power source) is slightly changed so that the inverter changes the effective power supplied to the power system or other power source. When the power system is connected to the distributed location power source, the frequency of the voltage at the system connection point is approximately equal to the specific frequency of the power system. On the other hand, when not the power system but another power source with a comparable power capacity to that of the distributed location power source is connected, the frequency of the voltgage at the connection point changes in accordance with the change of the effective power amount supplied from the distributed location power source. Accordingly, the effective ppwer supply amount of the distributed location power soruce is periodically changed by having the oscillator oscillate at a paricular frequency. Furthermore, the frequency component of the oscillator is extraced from the voltage signal at the AC output terminal of the inverter by the frequency component extractor having the same filter frequency as the oscillation frequency of the oscillator. Here, at the time when the power system is connected to the distributed location power source, the frequency component signal of the oscillator is not contained in the output signal from the frequency component extractor. On the other hand, when the power system is not connnected to the distributed location power source, it contains the frequency component signal of the oscillator. Thus, the system disconnection, or the condition that the power system is disconnected from the distributed location power source is detected by detecting the frequency component signal of the oscillator from the frequency component extractor and by testing whether the detected level exceeds a predetermined level by using the detection circuit.

In this way, the power system disconnection can be detected by the distributed location power source itself. Furthermore, it is possible to accurately detect power system disconnection because the effective power fluctuation period can take an optional value, and so it can be set at a value different from the variation period of the specific frequency or other frequencies of a general power system.

Furthermore, the detector can be provided with an opening control device and a close control device: the opening control device is provided for opening the circuit breaker on the AC output terminal of the distributed location power source in response to the system disconnection detection signal; and the close control device is provided for detecting the return of power of the power system after opening the circuit breaker on the AC output terminal and for closing the circuit breaker on the AC output terminal. The detection of the return of power is performed by detecting the closing of the circuit breaker on the power system side on the basis of a voltage difference between the circuit breaker on the AC output terminal of the distributed location power source and the line of the power system. In this way, the distributed location power source can be quickly reconnected to the power source after the return of power, because it is possible to detect the return of power of the power system side after system disconnection.

According to a fourth aspect of the present invention for solving the above problem, instead of having the output fluctuation frequency of the inverter fixed as with the arragement of the third aspect, it is changed according to an optional pattern. The frequency component to be extracted by the frequency component extractor also changes to be in tune with this. Only when the changing frequency component is detected through the entire changing pattern, the detection signal is produced from the detector. In other words, with the fourth aspect of the present invention, a first and a second oscillators are provided: the first oscillator applies its output to the effective power setter and the frequency component extractor as in the third aspect; and the second oscillator used to produce a disturbance pattern applies its output to the first oscillator. By this, the oscillation frequency of the first oscillator is changed within a fixed range by the oscillation period of the second oscillator. Also, the frequency component extractor changes the extraction frequency in tune with the oscillation frequency of the first oscillator.

Thus, the first oscillator changes its oscillation frequency according to a certain pattern so that the effective power supply amount of the distributed location power source is periodically changed. At the same time, the frequency component extractor, which changes its extraction frquency in accordance with the oscillation frequency of the first oscillator, detects the oscillation frequency component of the first oscillator from the voltage signal on the AC output terminal of the inverter. When the distributed location power source is connected to the power source through the line, the frequency of the voltage on the AC output terminal of the distributed location power source is maintained approximately equal to the specific frequency of the power system. As a result, the signal accompanying the change in the frequency of the first oscillator is not produced from the output of the frequency component extractor. On the other hand, during the system disconnection, the frequency component extractor extracts the AC output frequency changing component of the inverter throughout the entire pattern of the changing frequency. Thus, the detector produces a detection signal in this case only by judging that the system disconnection occurs.

For this reason, with the fourth aspect of the present invention, even when a low order frequency component of the specific frequency is normally included in the power system, erroneous detection related to system disconnection can be avoided. This is because a plurality of components of the changing frequency within a certain range are detected instead of detecting only a single component of the changing frequency when the power system is not connected.

Furthermore, the detector can be provided with an opening control device and a close control device: the opening control device is provided for opening the circuit breaker on the AC output terminal of the distributed location power source in response to the system disconnection detection signal; and the close control device is provided for detecting the return of power of the power system after opening the circuit breaker on the AC output terminal and for closing the circuit breaker on AC output terminal. The detection of the return of power is performed by detecting the closing of the circuit breaker on the power system side on the basis of a voltage difference between the circuit breaker on the AC output terminal of the distributed location power source and the line of the power system. In this way, the distributed location power source can be quickly reconnected to the power source after the return of power, because it is possible to detect the return of power of the power system side after system disconnection.

A fifth aspect of the present invention for solving the above problem is conceived on the fact that the impendance Zs of the transmission line seen from the distributed location power source side can have maximal values and minimal values at a plurality of frequencies. This is because the transmission line making up one part of the power system appears as a distributed constant line as shown in FIG. 10 (in FIG. 10, 900 designates a transmission line; 5 denotes a load circuit; 901 to 904 designate transmission line inductances; 905 to 907, transmission line capacitances; 501, a resistance; 502, a reactor; and 503, a capacitor).

In the fifth aspect of the present invention, the inverter of the distributed location power source has a function to produce such a waveform as formed by superimposing a voltage waveform corresponding to the command on a sinusoidal voltage having the same frequency as that of the power system, as the waveform of the alternating output power of the distributed location power source. The command signal of the voltage waveform to be superimposed on the sinusoidal voltage having the same frequency as that of the power system is supplied from the first oscillator.

When the oscillation frequency of the first oscillator is changed, a maximum output current flows from the distributed location power source to the power system at frequencies at which the impendance Zs of the transmission line takes a minimal value. On the other hand, a minimum output current flows from the distributed location power to the power system at frequencies at which the impedance Zs takes a maximal value. Furthermore, since there is a comparatively large number of frequencies producing the maximal and minimal current values, even if a resonance circuit is connected as a load of the distributed location power source as shown in FIG. 10, the number of resonance frequencies, that is, the number of frequencies at which a large current flows is sufficiently small compared to the number of the maximal current values of the transmission line.

Accordingly, in the fifth aspect of the present invention, the range $f_T$ of the oscillation frequency of the first oscillator is selected so as to contain as many frequencies as possible at which the maximal values of the current will occur. Then the oscillation frequency of the first oscillator is periodically changed within the frequency range $f_T$ according to the oscillating period of the second oscillator. By this, maximal currents corresponding to a plurality of oscillation frequencies of the first oscillator appear periodically in the AC output current of the distributed location power source. The frequency component extractor extracts the oscillation frequency components of the first oscillator from the AC output current of the distributed location power source. Out of these extracted frequency components, the counter counts the number of the maximal values of the current, that is, the number of the extracted values that exceed a prescribed value during one oscillation period of the second oscillator.

As stated before, when the distributed location power source is connected to a power system containing a transmission line, the count value of the counter is large. On the other hand, in the system disconnection state, the number of frequencies at which a maximal or a minimal current occurs suddenly decreases in the frequency range $f_T$ mentioned before. The reason for this is as follows: in a system disconnection condition, since the disconnection in general is carried out close to the receiving end of a long distance transmission line, the transmission line connected to the distributed location power source is very short; as a result, the frequency band showing maximal or minimal values of the transmission line impedance shift to the high frequency side, resulting in the decrease in the number of the maximal and minimal values. Accordingly, the detector can easily detect the system disconnection by receiving the count value of the counter and detecting the decrease in the count value of the counter.

By this, the distributed location power source itself is able to detect system disconnection. Additionally, even if a transmission line, another distributed location power source, or a generator and load are connected to the distributed location power source, high accuracy system disconnection detection can be achieved by detecting directly whether or not the harmonics of the natural frequency of the transmission line exist.

Furthermore, the detector can be provided with an opening control device and a close control device: the opening control device is provided for opening the circuit breaker on the AC output terminal of the distributed location power source in response to the system disconnection detection signal; and the close control device is provided for detecting the return of power of the power system after opening the circuit breaker on the AC output terminal and for closing the circuit breaker on the AC output terminal. The detection of the return of power is performed by detecting the closing of the circuit breaker on the power system side on the basis of a voltage difference between the circuit breaker on the AC output terminal of the distributed location power source and the line of the power system. In this way, the distributed location power source can be quickly reconnected to the power source after the return of power, because it is possible to detect the return of power of the power system side after system disconnection.

DETAILED DESCRIPTION OF THE PREFFERED EMBODIMENT(S)

The invention will now be described hereunder with reference to the accompanying drawings.

Figure 1:
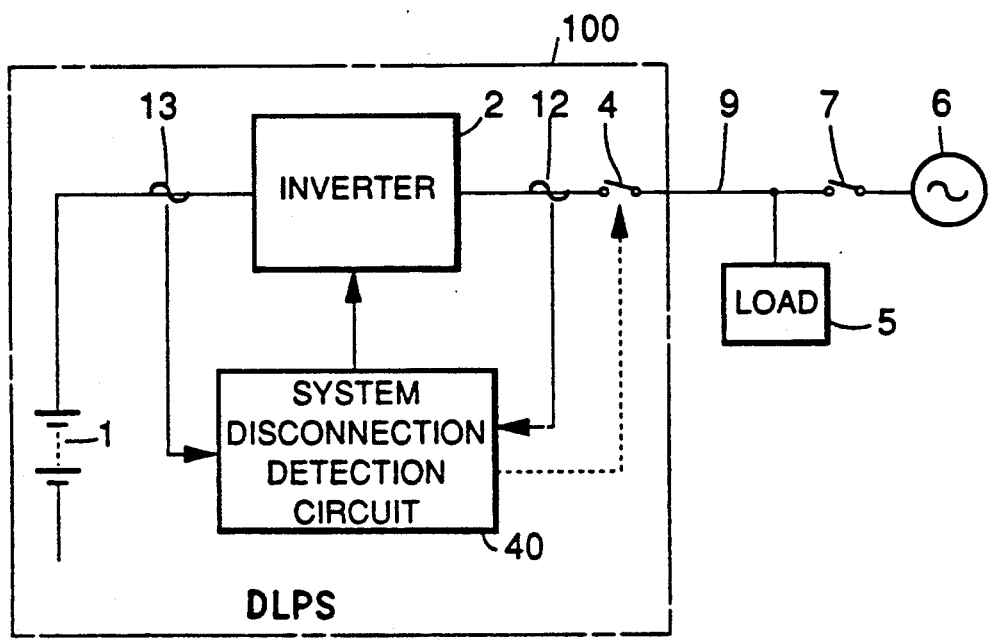
FIG. 1 is a structural diagram of a distributed location power source provided with a system disconnection detection circuit according to a first embodiment of the present invention.

FIG. 1 is a structural diagram of a distributed location power source provided with a system disconnection detection circuit related to a first embodiment of the present invention. As shown in FIG. 1, a DC power source 1 is connected to the DC input terminal of an inverter 2 by way of a power detector 13. The AC output terminal of the inverter 2 is connected to one end of a line 9 by way of an effective power detector 12 and a circuit breaker 4. The other end of the line 9 is connected to a power system 6 via a circuit breaker 7. A suitable load 5 is connected to the line 9. Reference numeral 100 designates a distributed location power source (DLPS) which comprises the DC power source 1, the inverter 2, the effective power detector 12, the power detector 13, a system disconnection detection circuit (SDDC) 40 and the circuit breaker 4.

With this arrangement, the system disconnection detection circuit 40 gives a command to the inverter 2 to slightly change the power to be outputted from the inverter 2. Also, it detects the slight change amount on the basis of the signal from the effective power detector 12. On the basis of the detection result, the opening of the circuit breaker 7 on the power source 6 side is detected. That is to say system disconnection is detected. Then at the time of system disconnection, the circuit breaker 4 is opened or the operation of the inverter 2 is stopped.

Figure 2:
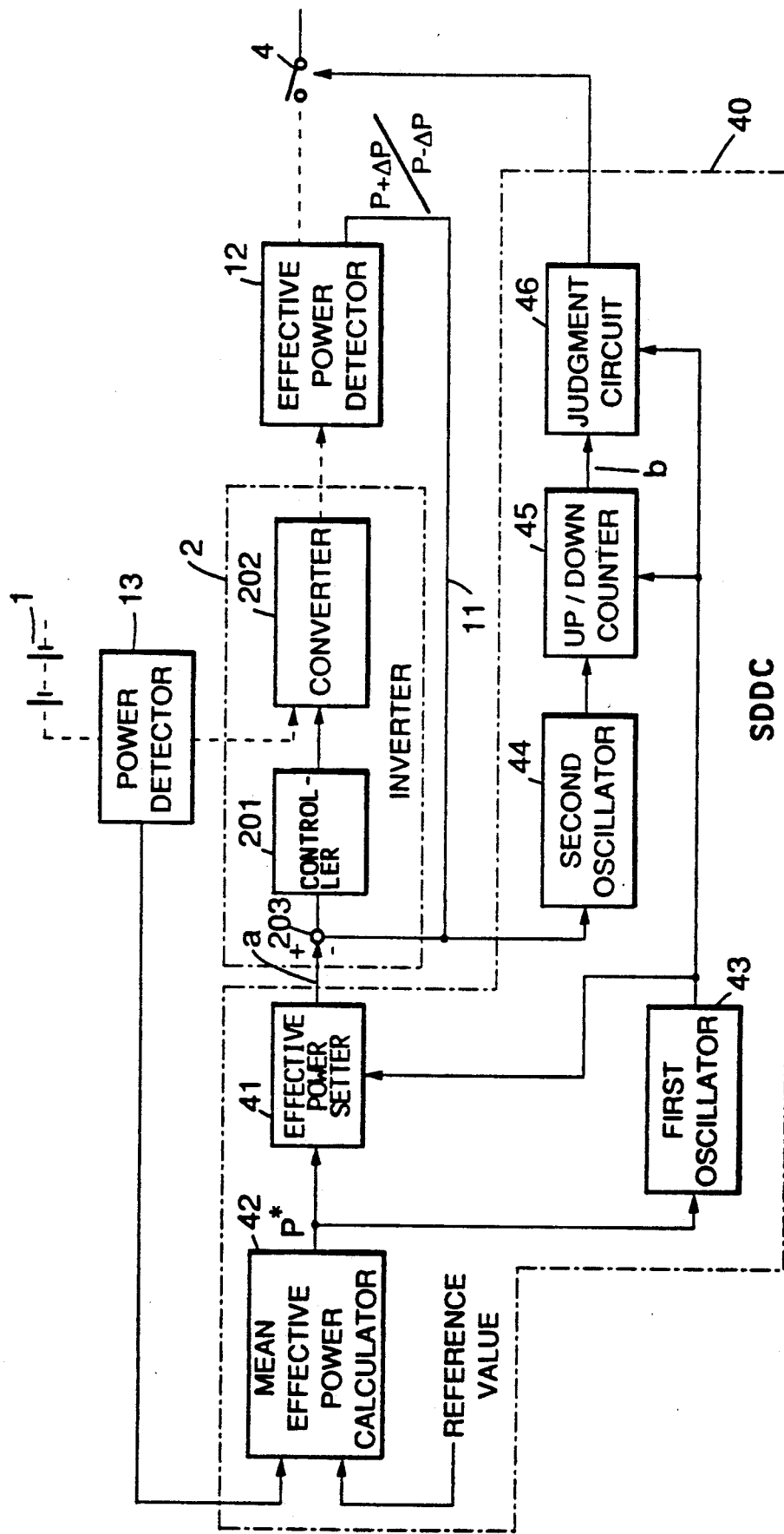
FIG. 2 is a block diagram of a system disconnection detection circuit according to the first embodiment.

FIG. 2 is a block diagram of the system disconnection detection circuit related to the first embodiment of the present invention.

In FIG. 2, reference numeral 42 designates a mean effective power calculator. On the basis of a predetermined reference value of the mean effective power, and a detected signal value from the power detector 13, an effective power command value P* for obtaining the mean effective power corresponding to the reference value of the mean effective power is calculated. The value P* is inputted to an effective power setter 41 and a first oscillator 43. The first oscillator 43 oscillates a square waveform signal of a frequency proportional to or substantially proportional to the effective power command value P*. The output signal of the oscillator 43 is applied to the control input terminal of the effective power setter 41, and the up/down count command input terminal of an up/down counter 45.

Figure 3:
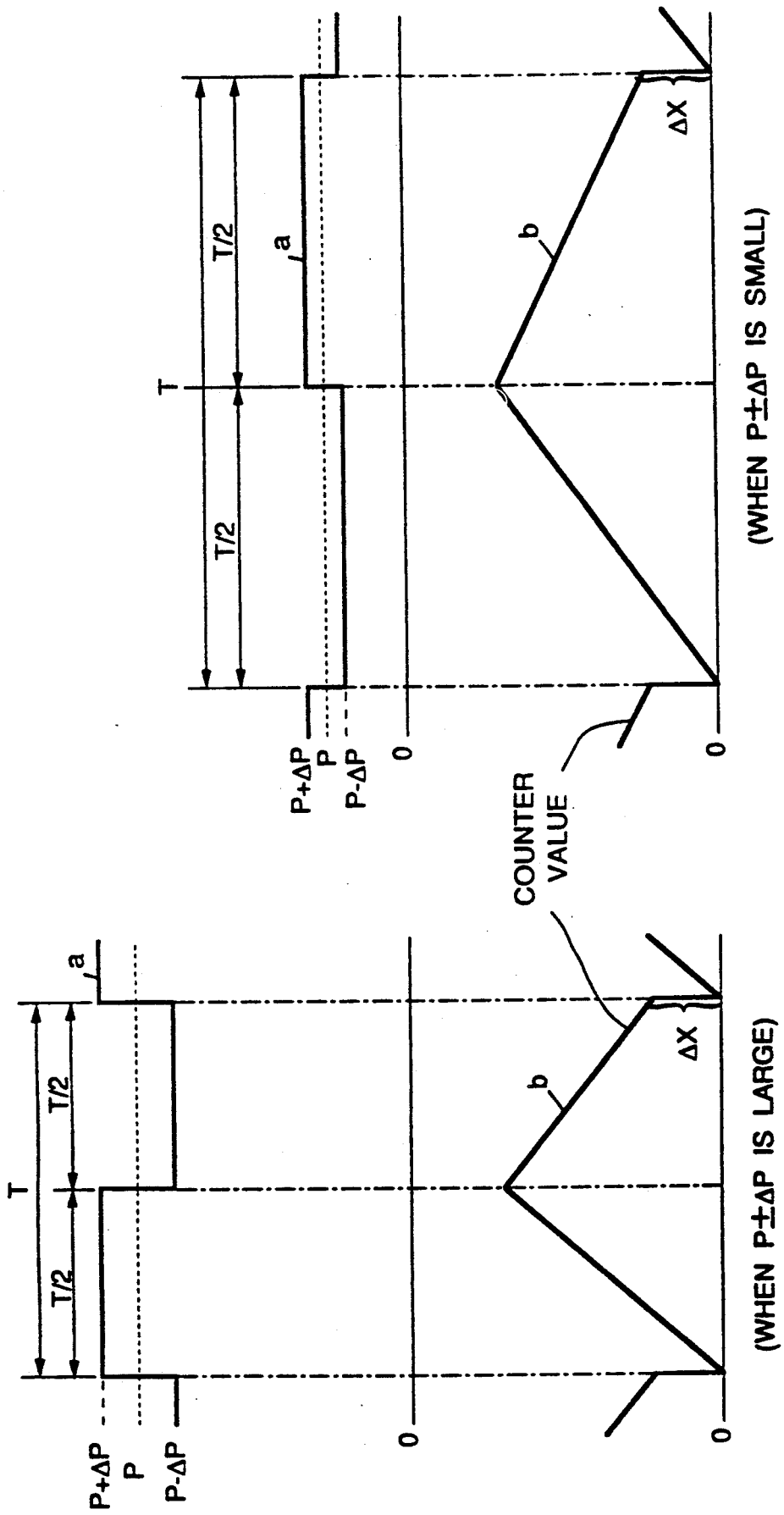
FIG. 3A is a diagram illustrating a signal waveform in the first embodiment.
FIG. 3B is a diagram illustrating another signal waveform in the first embodiment.

The effective power setter 41, synchronized with the oscillating period of the first oscillator 43, produces an effective power command value signal. This signal has the alternate amplitude of P*+ΔP and P*−ΔP which is formed by adding and subtracting a slight change amount ΔP to and from the effective power command value P*, the slight change value ΔP being specified to take a fixed ratio to the effective value command value P*. Examples of the waveforms of the output signal are shown as "a" in FIG. 3A and FIG. 3B. In these figures, T indicates the oscillating period of the first oscillator 43.

The inverter 2 comprises an adder 203, a controller 201 having, for example, a PI controller, and a converter 202 for converting DC to AC. The output signal (P*+ΔP/P*−ΔP) from the effective power setter 41 is supplied to the "+" input terminal of the adder 203, and the detection output signal (P+ΔP/P−ΔP) from the effective power detector 12 is fed back to the "−" input terminal of the adder 203. The output signal from the output terminal of the adder 203 is then supplied to the controller 201, and the output signal from the controller 201 is fed to the converter 202. Thus, a control loop 11 for controlling the effective power of the inverter 2 is constructed.

The dotted line from the DC power source 1 to the circuit breaker 4 indicates the main circuit in the inverter 2.

On the other hand, the detected output signal from the effective power detector 12 is fed to the second oscillator 44. The second oscillator 44 oscillates every T/2 interval at a frequency proportional to the value of P+ΔP or P−ΔP or proportional to the value of +ΔP or −ΔP, and produces the pulse train signal obtained from this. The pulse train signal is supplied to the count input terminal of the up/down counter 45. The up/down counter 45, in synchronism with the T/2 interval up/down command from the first oscillator 43, upcounts the pulse train signal when the command value from the effective power setter 41 is P*+ΔP, and downcounts the pulse train signal when the command value is P*−ΔP. In addition, the up/down counter 45 is reset every T interval. During the system connection, that is, when both the circuit breaker 4 in the distributed location power source and the circuit breaker 7 on the power system 6 side are closed, the waveform of the output signal of the counter 45 is as shown by "b" in FIG. 3A (when P±ΔP is large) and in FIG. 3B (when P±ΔP is small) (note: for convenience this is shown in the figures as an analog waveform). As is clear from the figures, the value (ΔX) of the result (before reset) of the up/down count for each time (every T) from the up/down counter 45 is practically constant in spite of the largeness or smallness of the effective power command value P*.

In contrast, during the system disconnection, that is, when the circuit breaker 7 on the power source 6 side is open, even if the effective power command value P*±ΔP is given to inverter 2, the effective power in the AC output of the inverter 2 shows practically no change. As a result, the detected value from the effective power detector 12 is practically constant. Accordingly the resultant count value (ΔX) for every T interval from the up/down counter 45 is approximately zero. From the above, a judgment circuit 46 judges whether or not there is a system disconnection by detecting if the up/down count value from the counter 45 directly before resetting is approximately zero or ΔX at every T interval on the basis of the signal from the first oscillator 43. When the system disconnection is determined, the circuit breaker 4 is opened. Here as previously mentioned, at the time of system connection, the value of ΔX is not influenced by the size of the effective power command value P* and is practically constant. Consequently it is clear that the reliability of the system disconnection detection operation in the judgment circuit 46 will be high.

As stated above, system disconnection can be reliably detected within the distributed location power source 100.

Figure 4:
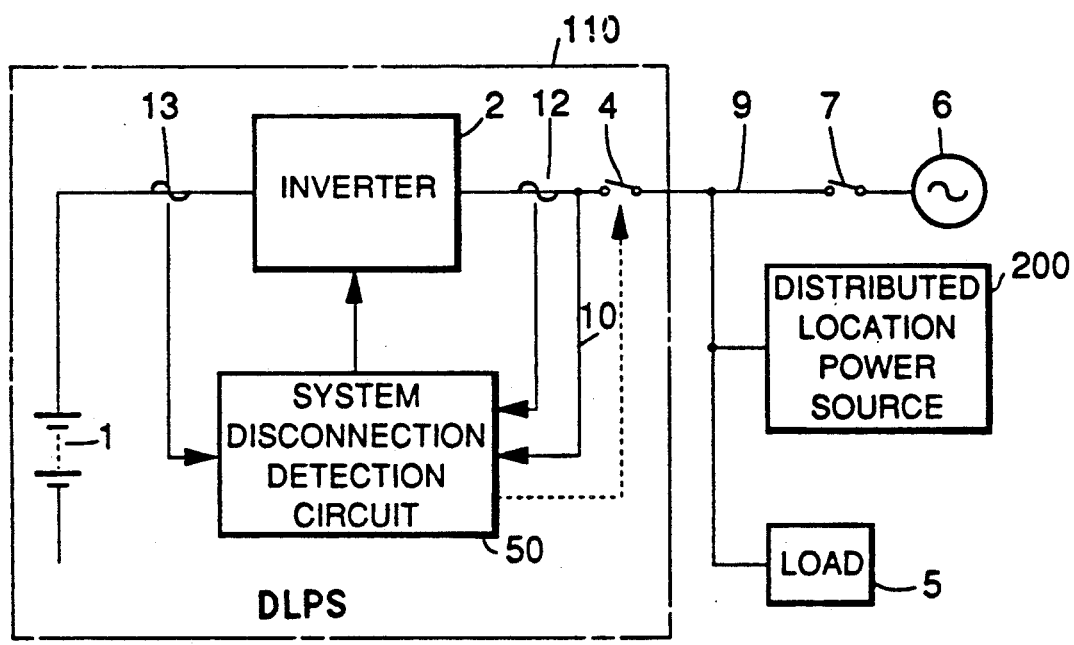
FIG. 4 is a structural diagram of a distributed location power source provided with a system disconnection detection circuit according to a second embodiment of the present invention.

FIG. 4 is a schematic diagram showing a distributed location power source provided with a system disconnection detection circuit related to a second embodiment of the present invention. As shown in FIG. 4, a distributed location power source (DLPS) 110 is made up of the DC power source 1, the inverter 2, the circuit breaker 4, a system disconnection detection circuit 50, the effective power detector 12 and the power detector 13. The DC power source 1 is connected to the DC input terminal of the inverter 2 by way of the power detector 13. The AC output terminal of the inverter 2 is connected to one end of the line 9 by way of the effective power detector 12 and the circuit breaker 4. The other end of the line 9 is connected to the power system 6 by the circuit breaker 7. Furthermore, the load 5 and another distributed location power source 200 is connected to the line 9, and also the AC output terminal of the inverter 2 is connected to the system disconnection detection circuit 50 by way of a system voltage (voltage waveform) signal line 10.

With this arrangement, the system disconnection detection circuit 50 gives to the inverter 2, a command to periodically slightly change the AC power to be produced from the inverter 2. Furthermore, it detects the periodic change of the AC voltage at the AC output terminal of the inverter 2 and, depending on the result of this detection, detects a system disconnection. When a system disconnection is detected, the circuit breaker 4 is opened or the operation of the inverter 2 is stopped.

Figure 5:
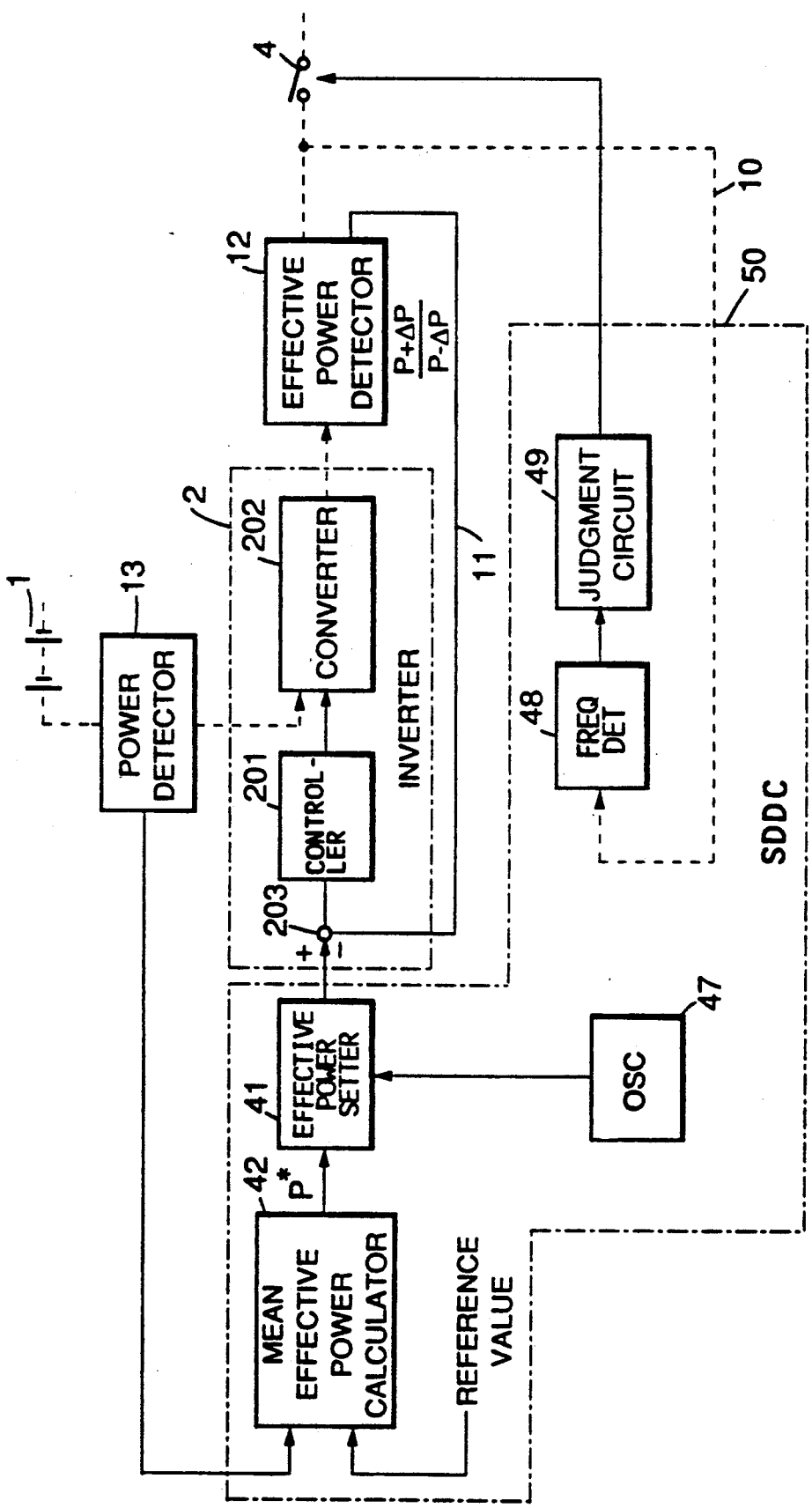
FIG. 5 is a block diagram of a system disconnection detection circuit according to the second embodiment.

FIG. 5 is a block diagram of the system disconnection detection circuit (SDDC) 50 related to the second embodiment of the present invention.

As shown in FIG. 5, the effective power command value P* from the mean effective power calculator 42 is applied to the effective power setter 41. The output signal from the oscillator (OSC) 47 is supplied to the control input terminal of the effective power setter 41. The effective power setter 41, being synchronized with the oscillation period ($1/f_D$) of the oscillator 47, outputs alternatively at $\frac{1}{2}f_D$ intervals, an effective power command signal having the alternate amplitude of P*+ΔP* and P*−ΔP*, the signal being calculated by adding to and subtracting from P* only the fluctuation amount ΔP* which bears a constant ratio to the effective power command value P*. The waveform of the output signal is shown as "a1" in FIG. 6A (during the system connection), and as "a2" in FIG. 6B (during the system disconnection).

The value obtained by subtracting the detected value (P+ΔP, P−ΔP) of the effective power detector 12 from the effective power command value (P*+ΔP*, P*−ΔP*) of the effective power setter 41 is inputted to the controller 201 by way of the adder 203, and the output signal from the controller 201 is fed to the converter 202. By this arrangement a control loop 11 for controlling the effective power of the inverter 2 is constructed.

On the other hand, a frequency detector (Freq Det) 48 including, for example, a band pass filter is supplied with a signal having a voltage waveform at the AC output terminal of the inverter 2 by way of the signal line 10. Then, a frequency component identical to the oscillation frequency of the oscillator 47 is extracted from this input signal and is outputted. This output signal is inputted to a judgment circuit 49. The judgment circuit 49 determines whether or not there is system disconnection by detecting if the input signal voltage is above a certain limit. If system disconnection is determined the circuit breaker 4 is opened.

Figure 6A:
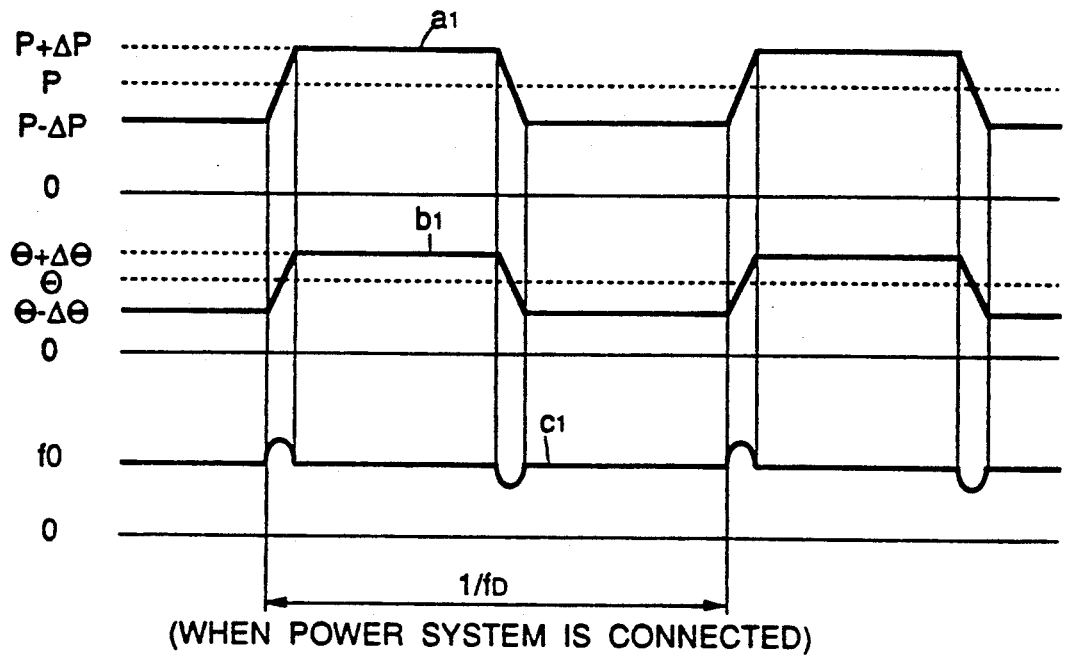
FIG. 6A is a diagram illustrating a signal waveform in the second embodiment.

When both the circuit breaker 4 of the distributed location power source and the circuit breaker 7 on the power system 6 side are closed (during the system connection), then, when the effective output power from the distributed location power source 110 is varied by $\pm \Delta P$ with respect to the mean value P, the phase change shown by "b1" in FIG. 6A is obtained. That is to say, since the inverter 2 contains internal impedance, a phase difference $\theta$ occurs between the internally produced voltage of the inverter 2 and the voltage on the line 9 connected to the AC output terminal of the inverter 2. Accordingly, when the system is connected, change in the effective output power of the inverter 2 by $\pm \Delta P$ results in change in the phase difference $\theta$ by $\pm \Delta \theta$. However at this time, since the frequency of the power system 6 side can be considered practically constant, the frequency fo of the distributed location power source 110 hardly changes as shown by "c1" in FIG. 6A.

Figure 6B:
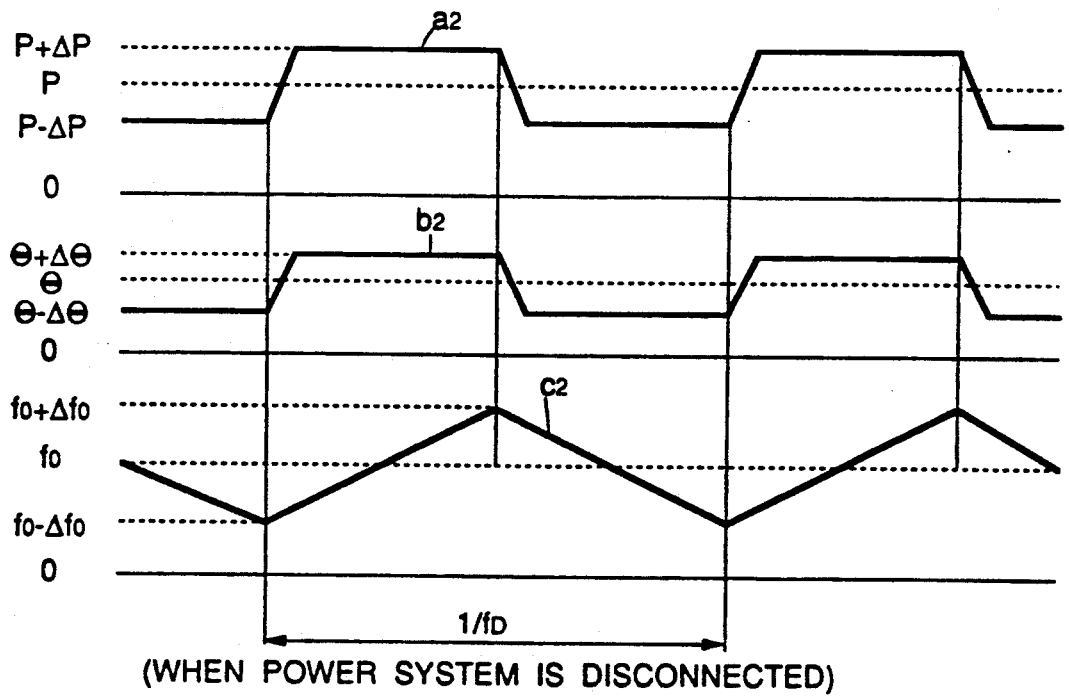
FIG. 6B is a diagram illustrating another signal waveform in the second embodiment.

On the other hand, when the circuit breaker 7 of the power system 6 side connected to the distributed location power source 110 is opened, and the distributed location power source 110 is connected to another distributed location power source 200 via the line 9 (that is, during the system disconnection), and when the effective output power of the inverter is changed by $\pm \Delta P$ with respect to the mean value P, the phase difference $\theta$ related to the distributed location source 110 changes by $\pm \Delta \theta$ as shown by "b2" in FIG. 6B in a similar way as before. At this time, the effective power change portion $\Delta P$ flows into the other distributed location power source 200 connected to the same line 9. However, each of the distributed location power sources 110 and 200 changes the frequency of the AC output voltage in a direction that reduces the phase difference $\pm \Delta \theta$, in order to eliminate the change portion $\Delta P$. As a result, the frequency fo of the output voltage at the AC output terminal of the inverter 2 (on line 9) is synchronized with the fluctuations of the effective power change portion ($\pm \Delta P$) as shown by "c2" in FIG. 6B and increases significantly.

The frequency detector 48 extracts the fluctuating frequency component corresponding to the change of the frequency fo. When the extracted output value exceeds a certain value, the judgment circuit 49 judges a system disconnection.

Figure 7:
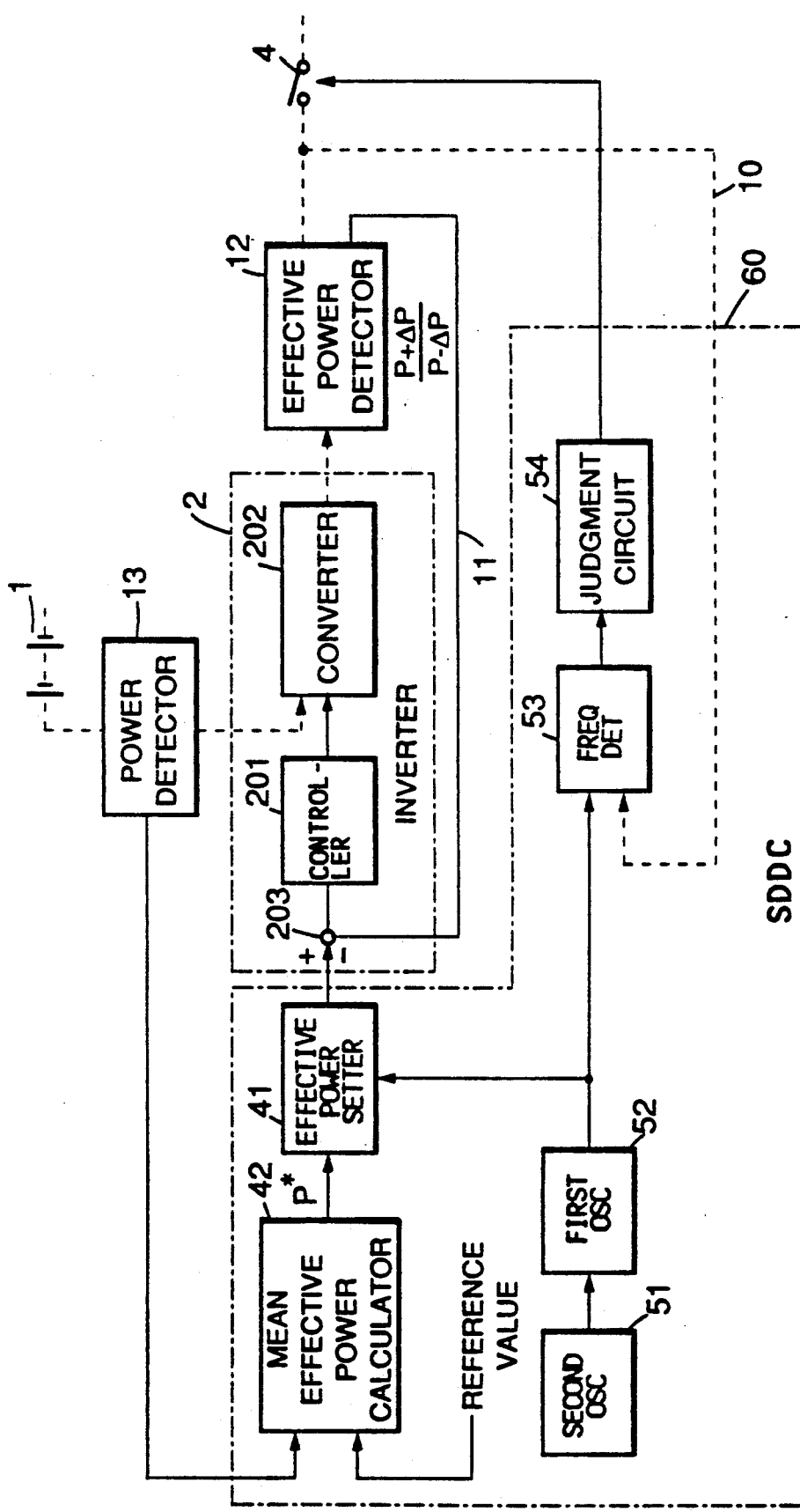
FIG. 7 is a block diagram of a system disconnection detection circuit according to a third embodiment of the present invention.

FIG. 7 is a block diagram of a system disconnection detection circuit related to a third embodiment of the present invention. The system disconnection detection circuit is applied to the distributed location power source shown in FIG. 4. In the system disconnection detection circuit (SDDC) 60, the oscillator output signal from the first oscillator (First OSC) 52 is inputted to the control input terminal of the effective power setter 41, and the oscillator output signal from the second oscillator (Second OSC) 51 is inputted to the input terminal of the oscillator 52. Here the second oscillator 51 produces a sawtooth waveform signal as an external disturbance pattern so that the oscillation frequency of the first oscillator 52 consisting of a voltage control type oscillator for example, is changed within predetermined range in response to the change of the sawtooth waveform voltage from the second oscillator 51. Also, the frequency detector (Freq Det) 53 has a band pass filter that changes the central frequency of the band pass region in tune with the oscillation frequency of the first oscillator 52.

With this embodiment also, when operating in a similar way as the second embodiment shown in FIG. 4 and FIG. 5, the judgment circuit 54 judges a system disconnection when the value of the output signal from the frequency detector 53 goes above a certain value, and the circuit breaker 4 is opened.

The oscillation frequency of the first oscillator 52 fluctuates within the predetermined range according to the sawtooth pattern of the second oscillator 51. The fluctuating frequency component in the AC output voltage of the inverter 2 is tuned with the oscillation frequency of the first oscillator 52 throughout this entire frequency fluctuation and extracted by the frequency detector 53 that changes the band pass central frequency.

Thus, in the third embodiment of the present invention, the fluctuating frequency component within a predetermined frequency range is extracted. As a result, undesirable conditions such as misinterpretation of system disconnection due to external noises can be eliminated even though the power system 6 is connected, and the low order proper frequency components originating in the control systems of installation equipment connected to the power system 6 are normally present on the line 9.

Figure 8:
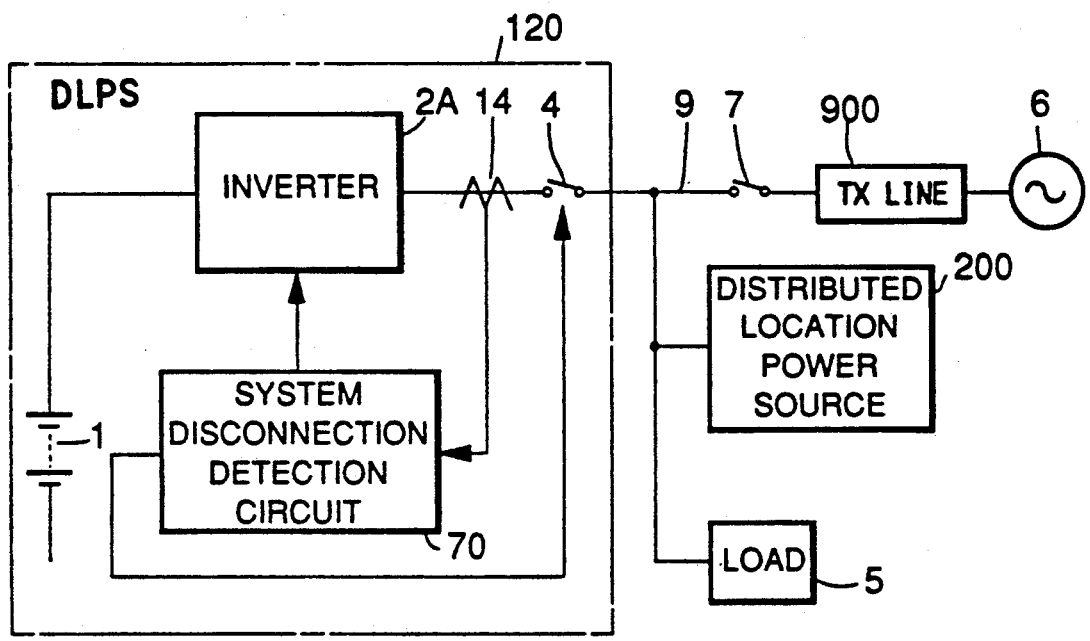
FIG. 8 is a structural diagram of a distributed location power source provided with a system disconnection detection circuit according to a fourth embodiment of the present invention.

FIG. 8 is a schematic diagram showing a distributed location power source provided with a system disconnection detection circuit of a fourth embodiment of the invention. As shown in FIG. 8, a distributed location power source (DLPS) 120 comprises the DC source 1, an inverter 2A, the circuit breaker 4, a system disconnection detection circuit 70, and a current detector 14. The DC source 1 is connected to the DC input terminal of the inverter 2A. The AC output terminal of the inverter 2A is connected to one end of the line 9 via the current detector 14 and the circuit breaker 4. The other end of the line 9 is connected to the circuit breaker 7 on the power system 6 side. A transmission line (TX Line) 900 is positioned between the circuit breaker 7 and the power system 6 and another distributed location power source 200 and the load 5 are connected to the line 9.

Figure 9:
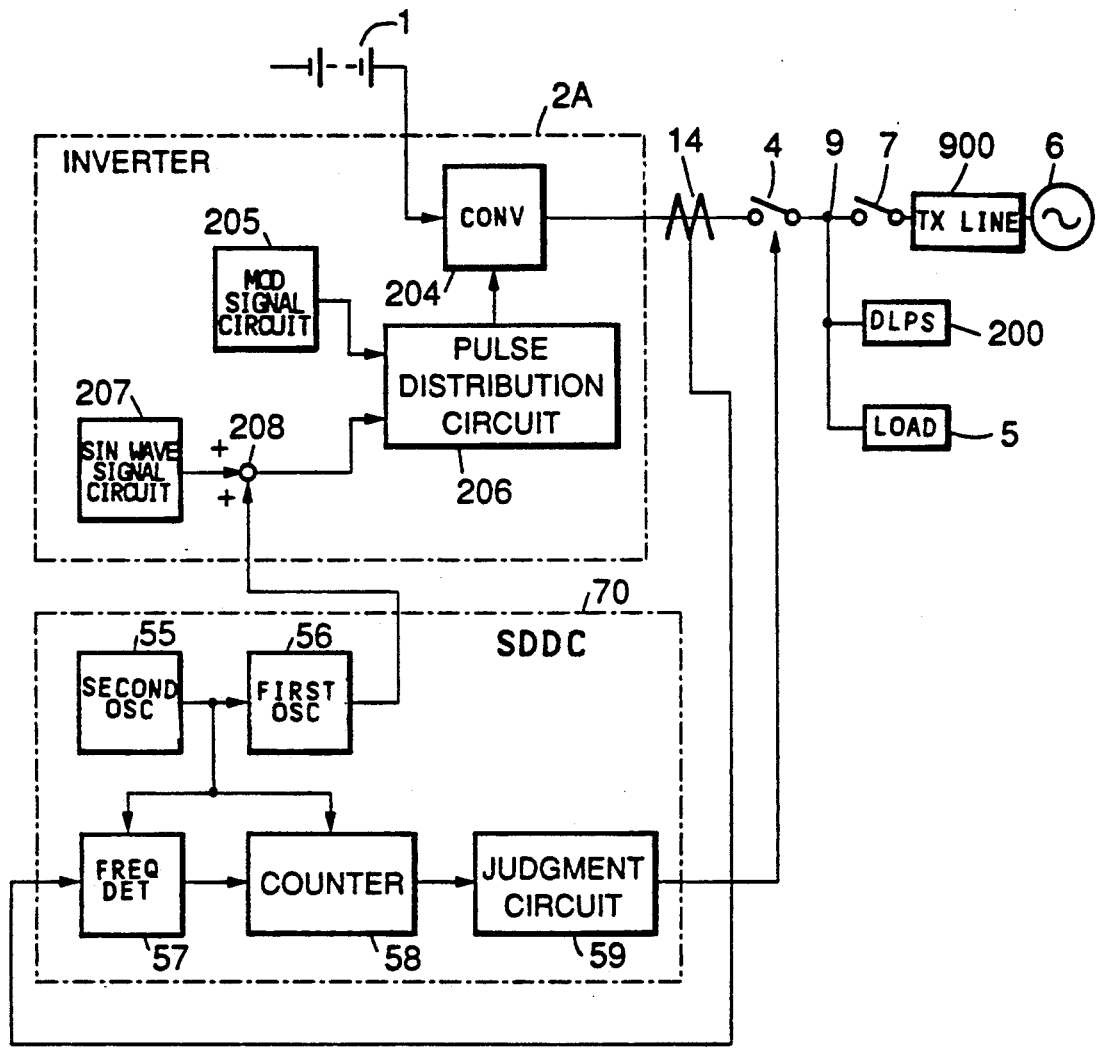
FIG. 9 is a block diagram of a system disconnection detection circuit according to the fourth embodiment.
Figure 10:
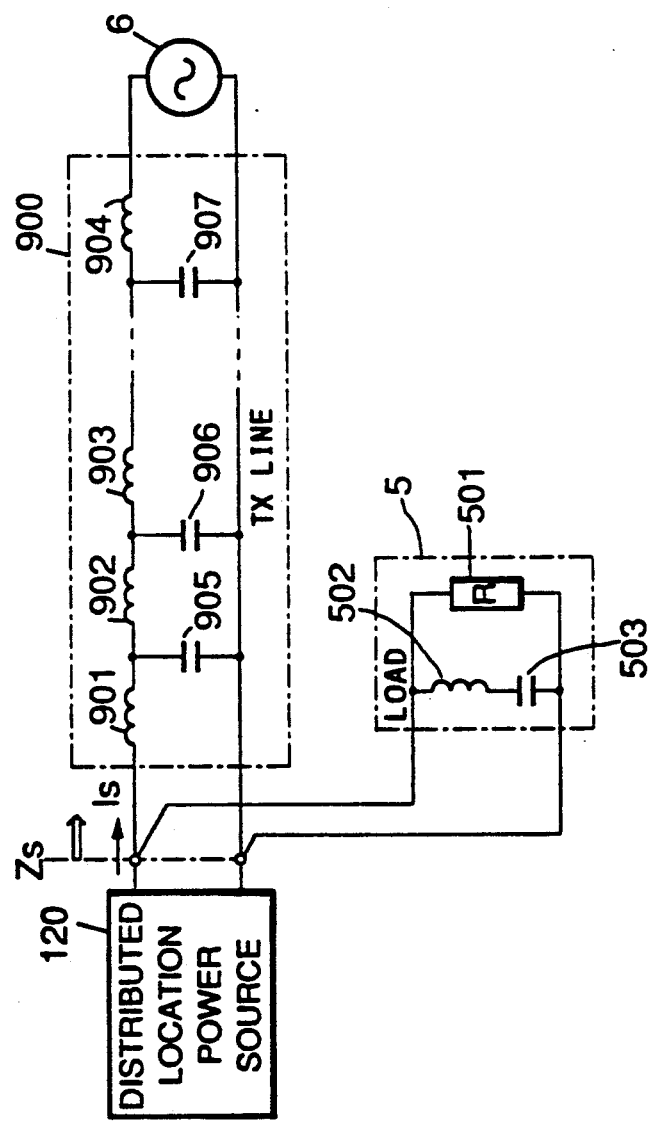
FIG. 10 is a diagram illustrating an example of a power system and load circuit.

FIG. 9 is a block diagram of the system disconnection detection circuit (SDDC) 70 related to the fourth embodiment of the present invention. As shown in FIG. 9, the inverter 2A is a PWM modulation type inverter using a sinusoidal wave and a triangular wave. The output signal of the sinusoidal wave signal circuit 207 for generating the AC output voltage waveform command of the inverter 2A, and the output signal of the first oscillator (First OSC) 56 for generating a waveform to be superimposed on the AC output voltage of the inverter 2A are added by the adder 208. The output signal from the adder 208, and the triangular wave output signal from the modulator signal circuit 205, are supplied to the pulse distribution circuit 206. The pulse distribution circuit 206 converts the supplied signals into a pulse width modulation signal, and then into the drive signal for each switching element inside the converter (CONV) 204 for converting from DC to AC. It is then supplied to the converter 204. Accordingly, the AC output voltage waveform from the converter 204 assumes a voltage waveform obtained by superimposing a waveform similar to the output voltage waveform from the first oscillator 56 on a sinusoidal voltage waveform having the specific frequency of the power system. The AC output voltage from the converter 204 is applied to the load 5 of the line 9, and to the transmission line (TX Line) 900. The AC output current from the inverter 2A is detected by the current detector 14. The output signal from current detector 14 is inputted to the frequency detector (Freq Det) 57 comprising a band pass filter the central frequency of the pass band of which is variable.

Incidentally, the sawtooth waveform output signal from the second oscillator (Second OSC) 55 is fed into the frequency detector 57 and the first oscillator 56. Thus, the oscillation frequency of the first oscillator 56, and the central frequency of the pass band of the frequency detector 57 have the same value. More specifically, the oscillation frequency of the first oscillator 56 is set according to the output voltage of the second oscillator 55. Accordingly, the central frequency of the pass band of the frequency detector 57 can be changed so as to become identical to the oscillation frequency of the first oscillator 56. It is also possible to directly change the central frequency of the pass band of the frequency detector 57 by means of the output signal from the first oscillator 56. Thus, a signal the frequency of which is the same as the oscillation frequency of the first oscillator 56 is obtained at the output terminal of the frequency detector 57.

Figure 11:
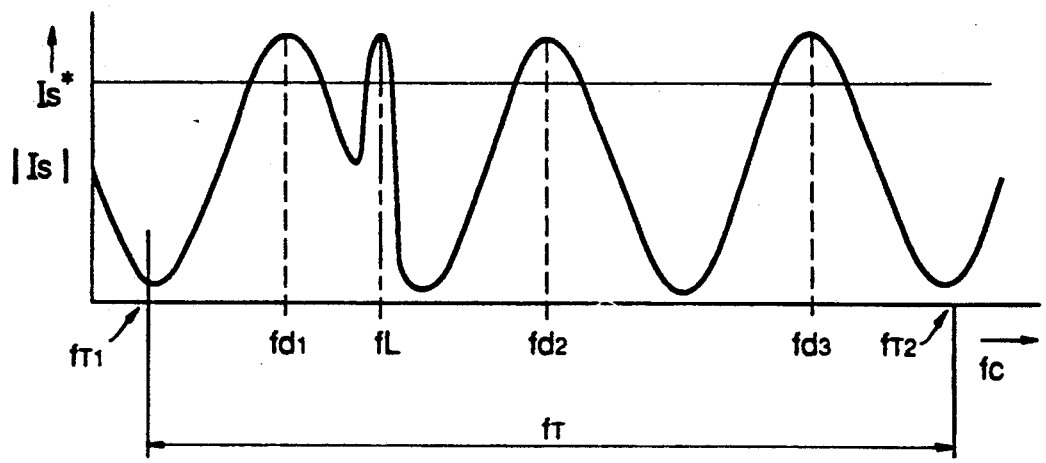
FIG. 11 is a diagram illustrating a signal waveform in the fourth embodiment.
Figure 12:
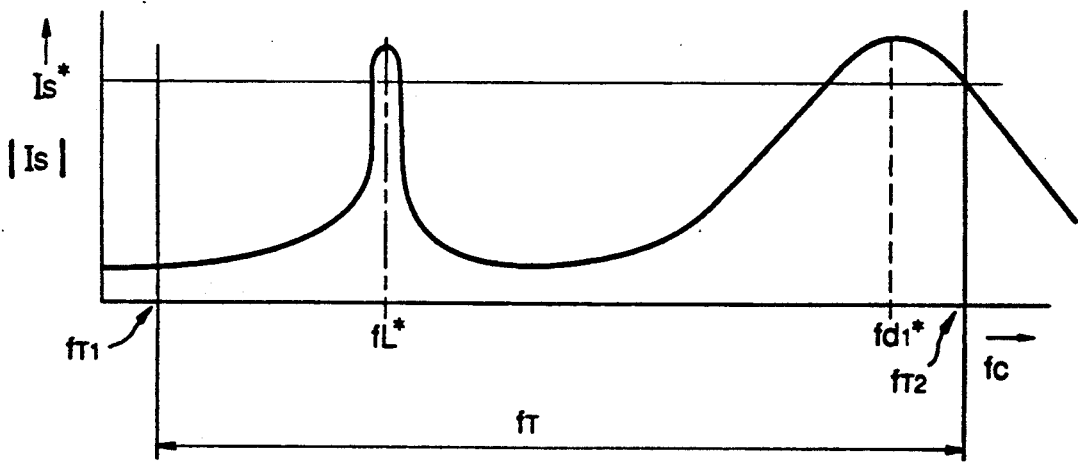
FIG. 12 is a diagram illustrating another signal waveform in the fourth embodiment.

As shown in FIG. 11 and FIG. 12, since the oscillation frequency fc of the first oscillator 56 is changed within the frequency range from $f_{T1}$ to $f_{T2}$ by the oscillating period of the second oscillator 55, the output current value |Is| of the frequency detector 57 increases or decreases in accordance with the change in the oscillator frequency fc. Furthermore, the output signal of the frequency detector 57 is fed to the count input terminal of the counter 58, and the output signal of the second oscillator 55 is applied to the reset input terminal of the counter 58. The counter 58 counts the number of times the output current value |Is| of the frequency detector 57 goes above the specific value Is* during one oscillation period of the second oscillator 55, i.e., while the oscillation frequency fc of the first oscillator 56 changes once from $f_{T1}$ to $f_{T2}$. Generally, the output current value |Is| of the frequency detector 57 becomes like that in FIG. 11 when the transmission line (TX Line) 900 is connected to the AC output terminal of the inverter 2A. In contrast, it becomes like that in FIG. 12 when the transmission line 900 from same output terminal is disconnected, that is to say, at the time of system disconnection. As a result, the count value of the counter 58 for the condition with the transmission line 900 connected differs from that for the condition with the transmission line 900 disconnected. The count output of the counter 58 is inputted to the judgement circuit 59, and the judgment circuit 59 outputs a system disconnection signal on the basis of the discrepancy in the count value.

Incidentally, a symbol $f_L$ represents the oscillation frequency of the circuit in the load 5 having a reactor 502 and a capacitor 503, and $f_{d1}$, $f_{d2}$ and $f_{d3}$ represent the paralledl resonance impedance of the transmission line (which is equivalent to a multiple parallel resonance circuit network).

Figure 13:
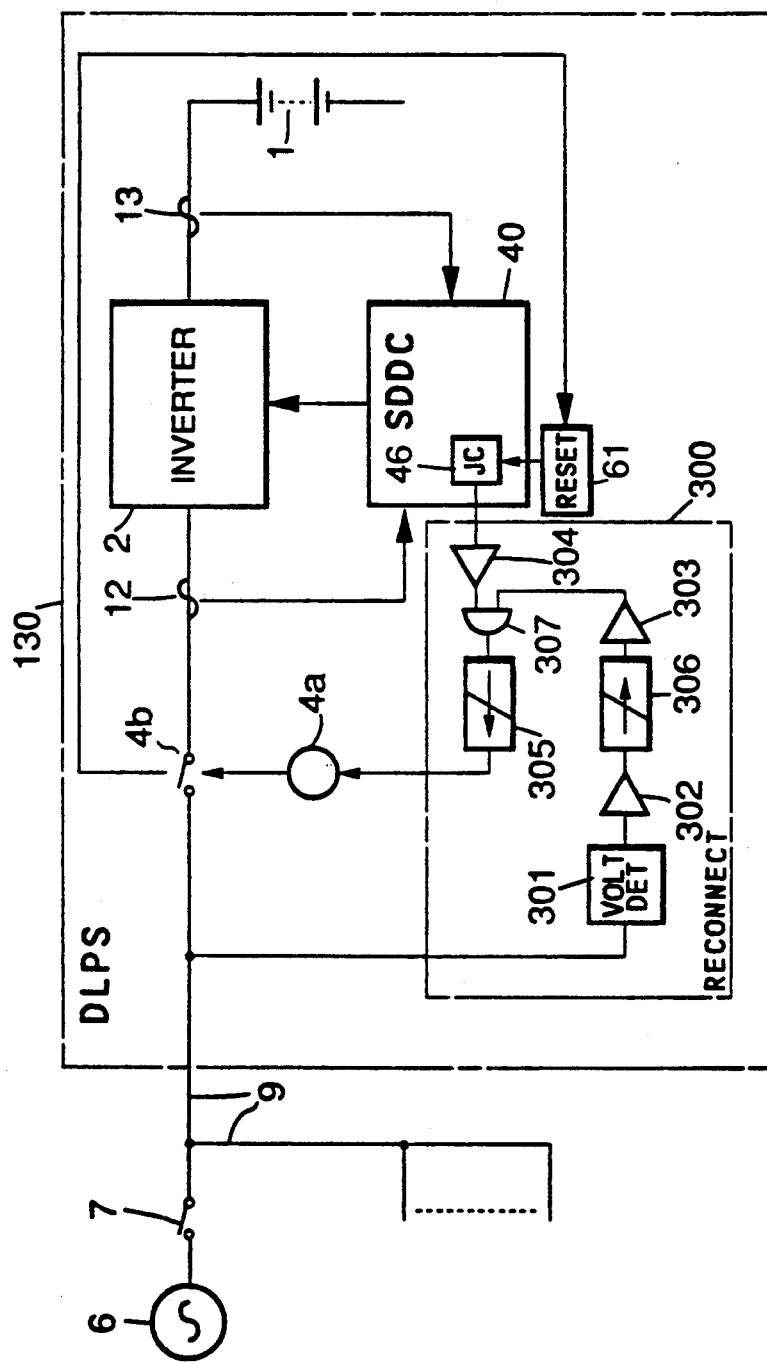
FIG. 13 is a structural diagram of a system disconnection detection circuit according to a fifth embodiment of the present invention.

FIG. 13 shows a fifth embodiment of the present invention. According to each of the above embodiments, system disconnection is positively detected, the circuit breaker of the distributed location power source is opened, and reverse current in lines and the like between the distributed location power source and the power system can be effectively stopped at the time of system disconnection.

Here with the fifth embodiment of the present invention, the recovery of power system side voltage is detected at the output terminal of the distributed location power source (DLPS) 130. When the recovery is detected, the circuit breaker of the distributed location power source is closed. Thus, the system disconnection detection circuit is provided with a function to reconnect the distributed location power source to the power system.

More specifically, in FIG. 13, reference numeral 40 designates the system disconnection detection circuit (SDDC) previously described with reference to FIG. 2. The output signal of the judgment circuit (JC) 46 within the system disconnection detection circuit 40 is inputted to a reconnect portion 300. The construction of the reconnect portion 300 is such that the voltage of the power system 6 is picked up from the line 9 connecting the circuit breaker 4b in the distributed location power source (DLPS) 130 and the circuit breaker 7 on the power system 6 side, and that the circuit breaker 4b is closed by means of the circuit breaker coil 4a in response to a logical judgment based on the picked up voltage and the output voltage from the judgment circuit 46 in the system disconnection detection circuit 40. A reference numeral 61 designates the reset circuit (RESET) which RESETS the judgment circuit 46 when a predetermined time elapses after the circuit breaker 4b is opened.

The construction of the reconnect portion 300 is further described in detail below. The reconnect portion 300 comprises a voltage detection circuit (VOLT DET) 301 for detecting the voltage of the power system 6 side, a NOT circuit 302, delay circuit 306 and NOT circuit 303, a NOT circuit 304 connected to the output terminal of the judgement circuit 46, and AND circuit 307 to which the output signal from the NOT circuit 303 and the output signal from the NOT circuit 304 are applied, and a delay circuit 305 connected to the output terminal of the AND circuit 307. The output signal of the delay circuit 305 is applied to the circuit breaker coil 4a.

An explanation of the operation of this construction will be given next with reference to the timing chart of FIG. 14.

Figure 14:
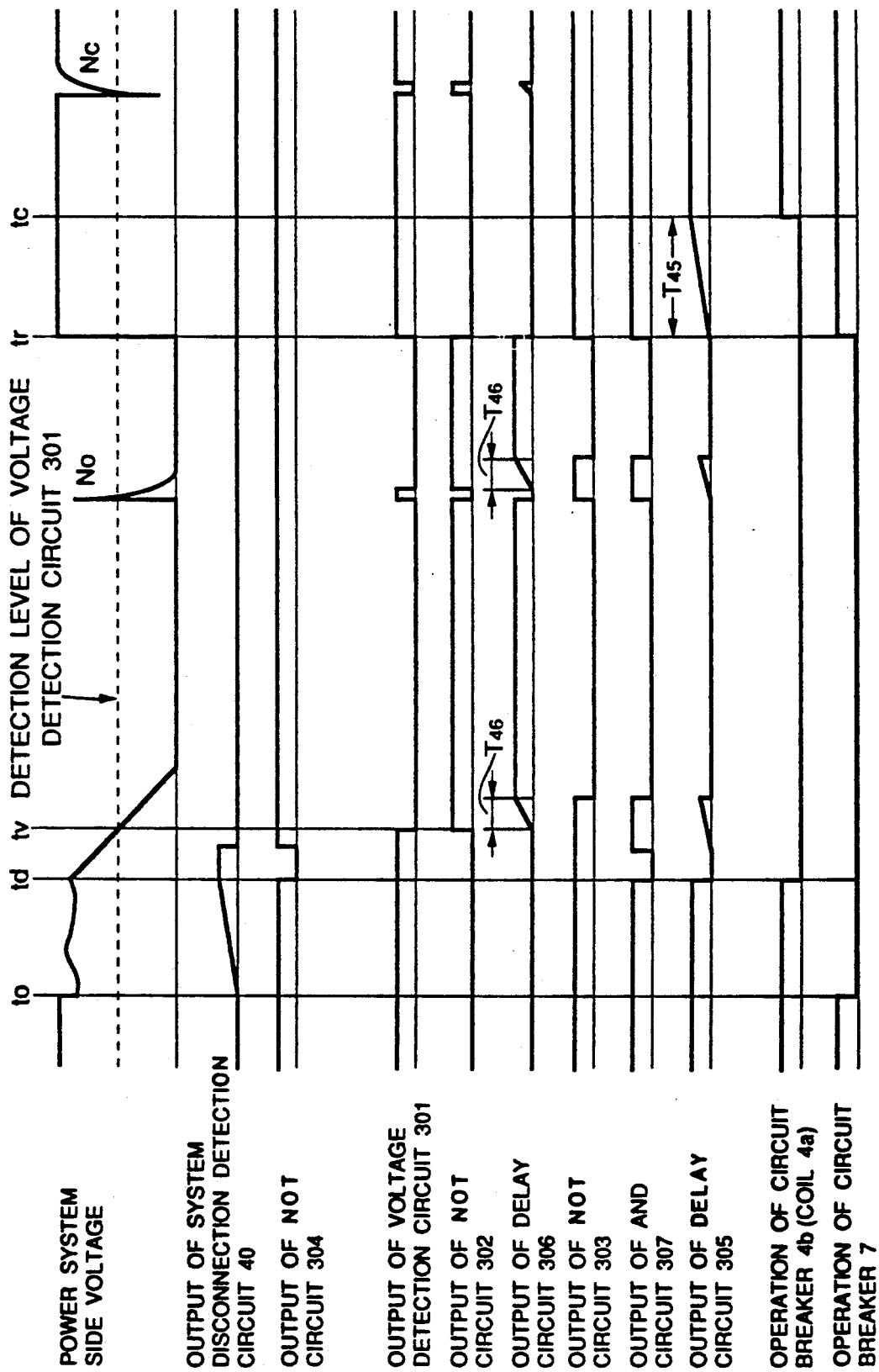
FIG. 14 is a diagram illustrating timing charts for each signal in the fifth embodiment.
Figure 15:
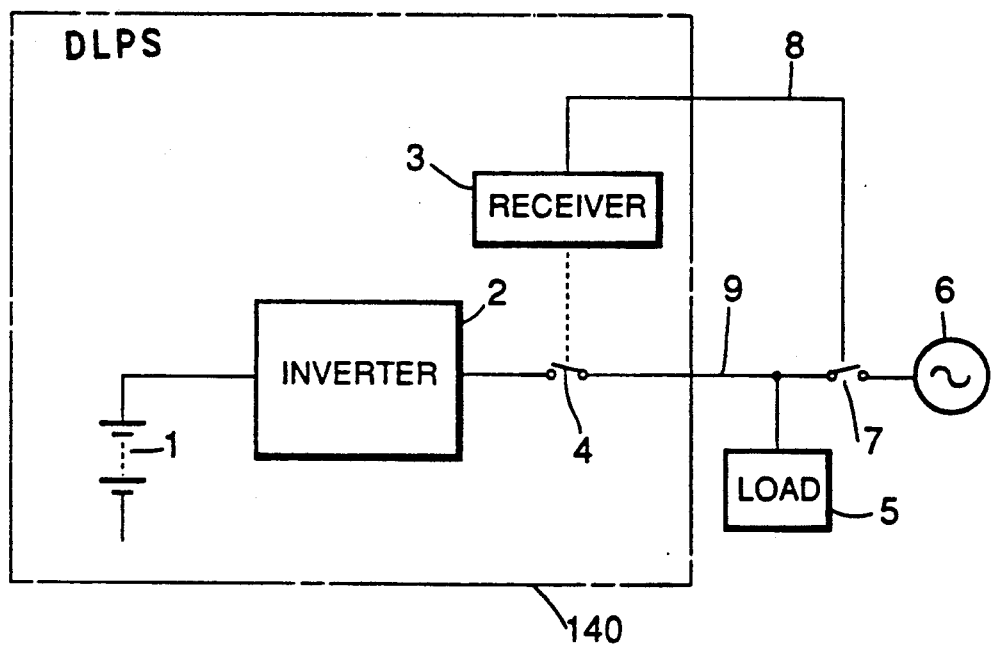
FIG. 15 is a structural diagram of a conventional system disconnection detection circuit.

At time $t_o$ in FIG. 14, the connection of the power system and the distributed location power source is broken by operation of the circuit breaker 7 (system disconnection). At time td, owing to operation of the system disconnection detection circuit 40, the output of the AND circuit 307, that is to say the output of the delay circuit 305, becomes "0", and the circuit breaker 4b is opened by means of the circuit breaker coil 4a. During this time, the output of the power detection circuit 301 maintains "1" up to the time tv after the time td. Also, the judgment circuit 46 in the system disconnection detection circuit 40 is reset after a predetermined time (before time tv is reached) by the reset circuit 61, and so the output of the system disconnection detection circuit 40 becomes "0".

Subsequently, at the time tr, when the circuit breaker 7 is again closed, and power is restored to the line 9 (on the power system side), the output of the voltage detector 301, that is, the output of the NOT circuit 303 also becomes "1". At this time, if the output of the system disconnection detection circuit 40 (judgment circuit 46) is "0", the output of the NOT circuit 304 is maintained at "1" and the output of the AND circuit 307 becomes "1". At the time tc after a delay time $T_{45}$ of delay circuit 305, the output of the delay circuit 305 also becomes "1", and the circuit breaker 4b is closed by means of the circuit breaker coil 4a. That is to say, the distributed location power source 130 is automatically reconnected to the power system.

Owing to the delayt time $T_{45}$ of the delay circuit 305, the circuit breaker 4b is not erroneously closed even if noise indicated by $N_o$ in FIG. 14 enters the reconnect portion 300. Furthermore, owing to the delay time $T_{46}$ of the delay circuit 306, the circuit breaker 4b is not erroneously opened even if noise indicated by Nc enters the reconnect portion 300. Here, the relation between the time delays $T_{45}$ and $T_{46}$ is that $T_{45} > T_{46}$.

With the fifth embodiment as above, at the time of power restoration of the power system, the circuit breaker 4b closes, effecting automatic and reliable reconnection of the distributed location power source 130 and power source 6, thereby eliminating the inconvenience of manually closing the circuit breaker 4b. Here the construction of the reconnect portion 300 is not limited to that shown in the figure.

INDUSTRIAL APPLICABILITY

The present invention is ideally suited to a distributed location power source wherein the generating element such as a solar cell is individually set up, for example, for each housing facility. With this type of distributed location power source, the connected power system includes a power plant, substations and transmission lines.

We claim:

1. A system disconnection detection circuit for a distributed location power source, for detecting disconnection of the power source from a power system, the power source having a generating element and an invertor for converting a generated DC output from said generating element into an invertor AC output, comprising:
    superimposing means for producing a control signal for controlling the invertor AC output, wherein said superimposing means comprises:
        first oscillating means for oscillating at a frequency substantially proportional to the generated output from said generating element; and
    invertor output setting means for producing the control signal, the control signal commanding an increasing and decreasing of the invertor AC output in synchronism with an oscillating period of the first oscillating means; and
    detection means for detecting a system disconnection from the power source by detecting a change in the invertor AC output inconsistent with the control signal, wherein said detection means comprises:
        second oscillator means for producing a pulse train signal of a frequency substantially proportional to the value of the invertor AC output, or an increase or decrease in value of the invertor AC output;
        a counter for upcounting and downcounting the number of pulses in the pulse train signal from the second oscillating means in synchronism with and during an oscillating period of the first oscillating means, the counter counting up to a resultant upcount when the control signal commands an increase in the invertor AC output and counting down to a resultant downcount when the control signal commands a decrease in the invertor AC output; and
        means for indicating a system disconnection by comparing the resultant upcount and downcount of the counter.

2. A system disconnection detection circuit for a distributed location power source as claimed in claim 1, wherein said detection means further comprises:
    opening control means for opening a circuit breaker on the invertor AC output in response to the system disconnection detection; and
    close control means for detecting, after opening of the circuit breaker, reconnection of the power system by sensing a voltage of the power system, and for closing the circuit breaker in response to the detection of system reconnection.

3. A system disconnection detection circuit for a distributed location power source, for detecting disconnection of the power source from a power system, the power source having a generating element and an invertor for converting a generated DC output from said generating element into an invertor AC output, comprising:
    superimposing means for producing a control signal for controlling the invertor AC output, wherein said superimposing means comprises:
        oscillating means for oscillating at a specific frequency; and
    invertor output setting means for producing the control signal, the control signal commanding an increasing and decreasing in the AC output of the invertor in synchronism with an oscillating period of the oscillating means; and
    detection means for detecting a system disconnection from the power source by detecting a change in the invertor AC output, wherein said detection means comprises:
        frequency component extraction means for extracting a frequency component from the invertor output, the frequency component being associated with the oscillating means; and
        means for detecting a system disconnection by detecting a change in the frequency component from the frequency component extraction means.

4. A system disconnection detection circuit for a distributed location power source as claimed in claim 3, wherein said detection means further comprises;
    opening control means for opening a circuit breaker on the invertor AC output in response to the system disconnection detection; and
    close control means for detecting, after opening of the circuit breaker, reconnection of the power system by sensing a voltage of the power system, and for closing the circuit breaker in response to the detection of system reconnection.

5. A system disconnection detection circuit for a distributed location power source as claimed in claim 3, further comprising:
    generating means for generating a periodic frequency change signal;
    wherein said oscillating means changes its oscillation frequency in response to the periodic frequency change signal from the generating means, and said frequency component extraction means is retuned to track the oscillating frequency of the oscillating means.

6. A system disconnection detection circuit for a distributed location power source as claimed in claim 5, wherein said detection means further comprises:
   opening control means for opening a circuit breaker on the invertor AC output in response to the system disconnection detection; and
   close control means for detecting, after opening of the circuit breaker, reconnection of the power system by sensing a voltage of the power system, and for closing the circuit breaker in response to the detection of system reconnection.

7. A system disconnection detection circuit for a distributed location power source, for detecting disconnection of the power source from a power system, the power source having a generating element and a PWM type invertor having a convertor circuit for converting a generated DC output from said generating element into an AC output, comprising:
   superimposing means for producing a control signal for controlling the invertor AC output, wherein said superimposing means comprises:
      sinusoidal wave signal output means for outputting an output voltage waveform command in the invertor;
      first oscillator means for producing an oscillating output signal;
      second oscillator means for cyclically changing an oscillation frequency of the first oscillating means output signal; and
      means for producing the control signal, the control signal being a pulse width modulation signal for controlling the converter circuit, the pulse width modulation signal being formed by adding the output voltage wave command signal from the sinusoidal wave signal output means to an oscillating output signal from the first oscillating means; and
   detection means for detecting a system disconnection from the power source by detecting a change in the invertor AC output, wherein said detection means comprises:
      frequency component extraction means for producing a signal by extracting a frequency component of the first oscillator means from the invertor AC output;
      a counter for producing a count value by counting the number of times the amplitude of the signal produced by the frequency component extraction means exceeds a predetermined value during one oscillation period of the second oscillator means; and
      means for detecting system disconnection by detecting a change in the count value from the counter during successive oscillation periods of the second oscillator means.

8. A system disconnection detection circuit for a distributed location power source as claimed in claim 6, wherein said detection means further comprises:
   opening control means for opening a circuit breaker on the invertor AC output in response to the system disconnection detection; and
   close control means for detecting, after opening of the circuit breaker, reconnection of the power system by sensing a voltage of the power system, and for closing the circuit breaker in response to teh detecting of system reconnection.

* * * * *